(12) United States Patent
Hayashi et al.

(10) Patent No.: US 12,162,185 B2
(45) Date of Patent: Dec. 10, 2024

(54) FIBER-REINFORCED RESIN PREPREG, MOLDED ARTICLE, AND FIBER-REINFORCED THERMOPLASTIC RESIN PREPREG

(71) Applicant: Mitsubishi Chemical Corporation, Tokyo (JP)

(72) Inventors: Takahiro Hayashi, Tokyo (JP); Naoki Sugiura, Tokyo (JP); Masayasu Hasuike, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 935 days.

(21) Appl. No.: 17/131,967

(22) Filed: Dec. 23, 2020

(65) Prior Publication Data

US 2021/0108042 A1 Apr. 15, 2021

Related U.S. Application Data

(63) Continuation of application No. PCT/JP2019/025886, filed on Jun. 28, 2019.

(30) Foreign Application Priority Data

Jun. 29, 2018 (JP) ................................ 2018-124472

(51) Int. Cl.
  *B29B 15/12* (2006.01)
  *B29K 101/12* (2006.01)
  *B29K 307/04* (2006.01)
  *C08J 5/24* (2006.01)

(52) U.S. Cl.
  CPC .............. *B29B 15/12* (2013.01); *C08J 5/248* (2021.05); *B29K 2101/12* (2013.01); *B29K 2307/04* (2013.01); *C08J 2361/02* (2013.01); *C08J 2361/16* (2013.01); *C08J 2461/02* (2013.01); *C08J 2461/16* (2013.01)

(58) Field of Classification Search
  CPC .. B29B 15/12; C08J 5/042; C08J 5/248; C08J 5/06; C08J 2361/02; C08J 2361/16; C08J 2461/02; C08J 2461/12; C08J 2479/08; B29K 2101/12; B29K 2307/04
  USPC ...................................................... 428/299.1
  See application file for complete search history.

(56) References Cited

U.S. PATENT DOCUMENTS

2007/0247026 A1  10/2007  Tsukamura et al.
2010/0215887 A1  8/2010  Kawabe
2015/0044470 A1* 2/2015  Tomioka ............... B29C 70/506
                                                        524/508
2016/0009881 A1  1/2016  Fujita et al.

FOREIGN PATENT DOCUMENTS

EP         0254488 A2     1/1988
EP         2832778 A1     2/2015
JP         S63-80411 A    4/1988
JP         2012220839 A   11/2012
JP         2012246442 A   12/2012
JP         5233130 B2     7/2013
JP         5250898 B2     7/2013
JP         2014105266 A   6/2014
JP         2016196142 A   11/2016
JP         2018048437 A   3/2018
WO         WO-2014084194 A1  6/2014

OTHER PUBLICATIONS

A.G. Gibson and J.- A.Manson, "Impregnation technology for thermoplastic matrix composites", Composites Manufacturing, vol. 3, No. 4, 1992, pp. 223-233.
International Search Report issued Sep. 17, 2019 in PCT/JP2019/025886 (with English translation), 4 pages.
Office Action issued Jul. 4, 2023 in Japanese Patent Application No. 2020-527692 (with English translation), 8 pages.
Office Action issued Apr. 11, 2023 in Japanese Patent Application No. 2020-527692 (with English translation), 9 pages.
Office Action issued Aug. 30, 2022 in Japanese Patent Application No. 2020-527692 (with English translation), 6 pages.
Cartie, D.D.R. et al: "Effect of resin and fibre properties on impact and compression after impact performance of CFRP", Composites Part A: Applied Science and Manufacturing, Elsevier, Amsterdam, NL, vol. 33 No. 4 XP004340323 Apr. 1, 2002 pp. 483-493.
Extended European Search Report issued Aug. 10, 2021 in Patent Application No. 19826498.8, 8 pages.
Ray, Dipa et al.: "Fracture toughness of carbon fiber/polyether ether ketone composites manufactured by autoclave and laser-assisted automated tape placement", Journal of Applied Polymer Science, vol. 2015, No. 41643, XP055828749, Jan. 1, 2014 pp. 1-10.

* cited by examiner

Primary Examiner — Camie S Thompson
(74) Attorney, Agent, or Firm — Element IP, PLC

(57) ABSTRACT

A fiber-reinforced resin prepreg and a molded article obtained by molding a molding material including the fiber-reinforced resin prepreg are described. The fiber-reinforced resin prepreg contains a carbon fiber bundle and a matrix resin composition. The ipa value of the carbon fiber bundle measured by an electrochemical measurement method is 0.14 $\mu A/cm^2$ or more. The impact strength of a film obtained by solidifying the matrix resin composition under particular molding conditions is 12.0 kJ/m or more.

20 Claims, No Drawings

FIBER-REINFORCED RESIN PREPREG, MOLDED ARTICLE, AND FIBER-REINFORCED THERMOPLASTIC RESIN PREPREG

This application is a continuation application of International Application No. PCT/JP2019/025886, filed on Jun. 28, 2019, which claims the benefit of priority of the prior Japanese Patent Application No. 2018-124472 filed in Japan on Jun. 29, 2018, the content of which is incorporated herein by reference.

TECHNICAL FIELD

The present invention relates to a fiber-reinforced resin prepreg, a molded article, and a fiber-reinforced thermoplastic resin prepreg.

BACKGROUND ART

In various fields such as aircraft parts and electrical/electronic parts, molded articles using fiber-reinforced thermoplastic resin prepregs, in which a thermoplastic resin composition is impregnated in a carbon fiber base material, are used. For example, a fiber-reinforced thermoplastic resin prepreg in which a polyetheretherketone (PEEK) resin is impregnated in a carbon fiber base material has been proposed (Non-Patent Literature 1).

As a method for manufacturing a fiber-reinforced thermoplastic resin prepreg, a method is known in which a film formed of a thermoplastic resin is superposed on a sheet-shaped carbon fiber base material in which carbon fibers are aligned unidirectionally, and heated and melted to impregnate the thermoplastic resin therein (Patent Literature 1 and 2, Non-Patent Literature 1).

CITATION LIST

Patent Literature

[Patent Literature 1]
 Japanese Patent No. 5233130
[Patent Literature 2]
 Japanese Patent No. 5250898

Non-Patent Literature

[Non-Patent Literature 1]
A. G. Gibson and J.-A. Manson, Composites Manufacturing, 4, 1992, 223-233.

SUMMARY OF INVENTION

Technical Problem

However, with fiber-reinforced thermoplastic resin prepregs of the related art such as Patent Literature 1 and 2 and Non-Patent Literature 1, although in the form of relatively thin sheets, it was difficult to obtain sufficient impact properties and it was difficult to obtain a molded article having excellent mechanical characteristics.

An object of the present invention is to provide a fiber-reinforced resin prepreg able to obtain a molded article having excellent mechanical characteristics; a fiber-reinforced thermoplastic resin prepreg able to obtain a molded article having excellent mechanical characteristics; and a molded article using the above.

Solution to Problem

As a result of intensive studies to solve the above problems, the present inventors found a relationship between the impact strength of the resin constituting the prepreg and the mechanical characteristics of the molded article at the time of molding and found that using a resin having a specific impact strength makes it possible to improve the mechanical characteristics of a molded article. To explain in more detail, when composite materials fracture, the possibility of fractures starting from the interface between the composite materials is high. In the fiber-reinforced resin prepreg, in a case where a resin having a relatively high viscosity at the time of impregnation, such as a thermoplastic resin, is used, it is difficult to completely impregnate the resin in the carbon fiber base material. Therefore, it is considered that on the interface between the carbon fiber and the resin, unimpregnated portions are dotted where the resin does not wet and spread on the surface of the carbon fiber, and these unimpregnated portions as defect points become the starting points and interface fractures occur. The present inventors found that using a resin composition having a specific impact strength and in which cracks do not easily propagate improves interfacial adhesion between the carbon fiber and the resin and makes it possible to obtain a molded article having excellent mechanical characteristics.

In addition, it was found that using carbon fibers in which the average roughness Ra of the surface is controlled in a specific range makes it possible to reduce the amount of a sizing agent to the carbon fibers, thereby making it possible to further improve the mechanical characteristics of the molded article.

That is, the present invention has the following configuration.

[1] A fiber-reinforced resin prepreg including a carbon fiber bundle, and a matrix resin composition, in which an ipa value of the carbon fiber bundle measured by an electrochemical measurement method (cyclic voltammetry) is 0.14 $\mu A/cm^2$ or more, and the matrix resin composition is a resin composition which satisfies Condition 1 below, Condition 1: an impact strength of a film obtained by solidifying the matrix resin composition under Molding Conditions below is 12.0 kJ/m or more, and the impact strength is a value measured in Impact Test below,
(Molding Conditions)
the matrix resin composition is extruded and drawn such that a draw ratio is 1.1 times, and brought into contact for three seconds with a roll temperature-controlled to a temperature of (Tm −125°) C in a case where a crystal melting enthalpy ΔHm of the matrix resin composition is 10 J/g or more, or to a temperature of (Tg −30°) C in a case where the crystal melting enthalpy ΔHm of the matrix resin composition is less than 10 J/g, and a film having a thickness of 40 to 60 μm is obtained, where Tg and Tm are respectively a glass transition temperature and a melting point in differential scanning calorimetry (DSC) in accordance with ISO11357,
(Impact Test)
a test piece of 100 mm in length×100 mm in width is cut out from the film, the test piece is fixed with a clamp, a striking core with a ½ inch diameter is dropped at a falling speed of 3 m/sec on a center of the test piece under conditions of a temperature of 23° C. to apply an impact thereto, and impact absorption energy when the test piece is fractured is measured and divided by the film thickness to obtain the impact strength of the film.

[2] The fiber-reinforced resin prepreg according to [1], in which the matrix resin composition is a thermoplastic resin composition.

[3] The fiber-reinforced resin prepreg according to [1] or [2], in which an average roughness Ra of a surface of single fibers constituting the carbon fiber bundle included in the carbon fiber base material is 1.0 nm or more and 4.0 nm or less.

[4] The fiber-reinforced resin prepreg according to any one of [1] to [3], in which an ipa value of the carbon fiber bundle measured by an electrochemical measurement method (cyclic voltammetry) is 0.14 µA/cm² or more and 0.20 µA/cm² or less.

[5] The fiber-reinforced resin prepreg according to any one of [1] to [4], in which a quantity of oxygen-containing functional groups ($O_{1S}/C_{1S}$) on a surface of the carbon fiber bundle measured by X-ray photoelectron spectroscopy is 0.070 or more and 0.130 or less, and a quantity of nitrogen-containing functional groups ($N_{1S}/C_{1S}$) is 0.065 or more and 0.100 or less.

[6] The fiber-reinforced resin prepreg according to any one of [1] to [5], in which a strand strength of the carbon fiber bundle is 5600 MPa or more and a strand elastic modulus of the carbon fiber bundle is 250 GPa or more and 380 GPa or less.

[7] The fiber-reinforced resin prepreg according to any one of [1] to [6], in which the matrix resin composition satisfies Condition 2 below, Condition 2: the impact strength is 12.0 kJ/m or more and 20.0 kJ/m or less.

[8] The fiber-reinforced resin prepreg according to any one of [1] to [7], in which the carbon fiber base material is a carbon fiber base material in which the carbon fiber bundle is oriented unidirectionally.

[9] The fiber-reinforced resin prepreg according to any one of [1] to [8], in which the matrix resin composition satisfies Condition 3 below, Condition 3: when the matrix resin composition is drawn such that a draw ratio is 1.1 times and is made into a film having a thickness of 40 to 60 µm, a tear strength of the film measured by the method specified in JIS K7128 (C method) in both a MD direction and a TD direction is 1200 N/mm or more.

[10] The fiber-reinforced resin prepreg according to any one of [1] to [9], in which the matrix resin composition contains a polyarylketone resin having a branched structure.

[11] The fiber-reinforced resin prepreg according to any one of [1] to [10], in which the matrix resin composition contains a polyarylketone resin having a melt volume rate (MVR; set temperature: 380° C., load: 5 kg) of 1 to 80 cm³/10 min, the melting rate being measured according to ISO1133.

[12] The fiber-reinforced resin prepreg according to any one of [1] to [11], in which the matrix resin composition contains a polyarylketone resin and includes a polyetheretherketone resin having a structural unit represented by Formula (4).

Formula 4

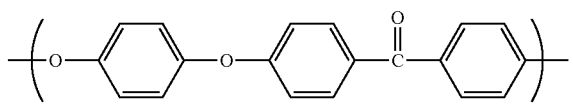

[13] A molded article obtained by molding a molding material including the fiber-reinforced thermoplastic resin prepreg according to any one of [1] to [12].

[14] A fiber-reinforced resin prepreg including a carbon fiber bundle, and a matrix resin composition, in which an ipa value of the carbon fiber bundle measured by an electrochemical measurement method (cyclic voltammetry) is 0.14 µA/cm² or more, and the matrix resin composition is a resin composition which satisfies Condition 4 below, Condition 4: an impact strength of a film obtained by solidifying the matrix resin composition under Molding Conditions below is 15.2 kJ/m or more and the impact strength is a value measured in Impact Test below, (Molding Conditions)

the matrix resin composition is extruded and drawn such that a draw ratio is 1.1 times, and brought into contact for three seconds with a roll temperature-controlled to a temperature of (Tm −125°) C in a case where a crystal melting enthalpy ΔHm of the matrix resin composition is 10 J/g or more, or to a temperature of (Tg −30°) C in a case where the crystal melting enthalpy ΔHm of the matrix resin composition is less than 10 J/g, and a film having a thickness of 40 to 60 µm is obtained, where Tg and Tm are respectively a glass transition temperature and a melting point in differential scanning calorimetry (DSC) in accordance with ISO11357, (Impact Test)

a test piece of 100 mm in length×100 mm in width is cut out from the film, the test piece is fixed with a clamp, a striking core with a ½ inch diameter is dropped at a falling speed of 3 m/sec on a center of the test piece under conditions of a temperature of 23° C. to apply an impact thereto, and impact absorption energy when the test piece is fractured is measured and divided by the film thickness to obtain the impact strength of the film.

[15] A fiber-reinforced thermoplastic resin prepreg, in which a matrix resin composition is impregnated in a carbon fiber base material, an average roughness Ra of a surface of single fibers constituting a carbon fiber bundle included in the carbon fiber base material is 1.0 to 4.0 nm, an ipa value of the carbon fiber bundle measured by an electrochemical measurement method (cyclic voltammetry) is 0.14 to 0.20 µA/cm², and the matrix resin composition is a thermoplastic resin composition having an impact absorption energy of 0.7 J or more measured in impact Test below, (Impact Test)

a test piece of 100 mm in length×100 mm in width is cut out from a film having a thickness of 100 µm formed using the matrix resin composition, the test piece is fixed with a clamp, a striking core with a ½ inch diameter is dropped at a falling speed of 3 m/sec on a center of the test piece under conditions of a temperature of 23° C. to apply an impact thereto, and impact absorption energy when the test piece is fractured is measured.

Effects of Invention

According to the present invention, it is possible to provide a fiber-reinforced resin prepreg able to obtain a molded article having excellent mechanical characteristics; a fiber-reinforced thermoplastic resin prepreg able to obtain a molded article having excellent mechanical characteristics; and a molded article using the above.

DESCRIPTION OF EMBODIMENTS

In the present specification, "to" indicating a numerical range means that the numerical values described before and after are included as the lower limit value and the upper limit value, respectively.

[Fiber-Reinforced Resin Prepreg]

The fiber-reinforced resin prepreg of the present invention (also referred to below as "the prepreg") is a sheet-shaped, fiber-reinforced composite molding material in which a matrix resin composition is impregnated in a reinforcing fiber base material. As described below, the prepreg is a combination of a specific carbon fiber bundle and a specific matrix resin composition.

(Carbon Fiber Base Material)

The form of the carbon fiber base material is not particularly limited, and a fiber form in which carbon fiber bundles are oriented unidirectionally, or a fiber form such as plain weave, twill weave, or satin weave is suitable. Among these, a carbon fiber base material with a fiber form in which carbon fiber bundles are oriented unidirectionally is preferable.

The thickness of the carbon fiber base material is preferably 0.015 to 0.7 mm, and more preferably 0.04 to 0.4 mm in terms of residual stress during molding.

The carbon fiber is not particularly limited, and examples thereof include polyacrylonitrile (PAN)-based, petroleum/coal pitch-based, rayon-based, lignin-based, and the like.

As a carbon fiber bundle A, a tow formed of 12,000 to 60,000 PAN-based carbon fibers is preferable in terms of excellent productivity and mechanical characteristics on an industrial scale.

The carbon fiber base material is preferably a sheet-shaped base material including carbon fiber bundles constituted of carbon fibers a described below (also referred to below as "carbon fiber bundle A").

The carbon fiber base material of the prepreg may include reinforcing fibers other than the carbon fibers a in a range in which the effects of the present invention are not impaired. As the reinforcing fibers other than the carbon fibers a, for example, it is possible to use any reinforcing fibers of any of glass fibers, metal fibers, or organic fibers.

The ratio of the carbon fibers a in the carbon fiber base material of the prepreg is preferably 80% by mass or more with respect to the total mass of the reinforcing fibers, more preferably 90% by mass or more, even more preferably 95% by mass or more, and particularly preferably 100% by mass.

(Carbon Fiber a)

The average roughness Ra of the surface of the carbon fibers a (single fibers) constituting the carbon fiber bundle A is preferably 1.0 to 4.0 nm, and more preferably 1.0 to 3.0 nm.

When Ra is the lower limit value of the above range or more, the impregnation property of the matrix resin composition is sufficient. To explain in more detail, the surface smoothness of the carbon fibers being high makes it possible to reduce the amount of a sizing agent and the adhesion between the carbon fibers is decreased, thus, the carbon fibers are easily scattered in the carbon fiber bundle. Therefore, as the matrix resin composition, even in a case of impregnating a thermoplastic resin composition having a relatively high viscosity even at a high temperature, it is easy for the resin to wet and spread on the carbon fiber surface. Due to this, it is possible to reduce the portion of the carbon fiber surface which is not in contact with the resin, thus, it is possible to manufacture a molded article having high interfacial adhesion between the carbon fiber and the resin.

In addition, convex portions of the carbon fibers have a low fracture toughness structurally and stress tends to concentrate at the interface between the carbon fibers and the resin, thus, even a relatively small load causes a fracture starting point and interfacial fractures progress easily. However, when Ra is the upper limit value of the above range or less, it is easy to suppress the progress of interfacial fractures starting from the convex portions of the carbon fibers.

The average roughness Ra of the surface of the carbon fibers, which are single fibers, is measured by the following method.

Several carbon fibers constituting a carbon fiber bundle are taken out and placed on a sample table, both ends of the carbon fibers are fixed, and dotite is applied to the periphery thereof to make a measurement sample.

Using an atomic force microscope, in AFM mode, scanning is repeatedly carried out while gradually shifting a cantilever in a range of 600 nm in the direction (circumferential direction) perpendicular with respect to the fiber axis direction on the surface of the carbon fiber of the measurement sample, over a length of 600 nm in the fiber axis direction. The obtained measured image is subjected to a two-dimensional Fourier transform and low-frequency components are cut out, then an inverse transform is performed to obtain a plane image of a cross-section in which the curvature of the carbon fibers is removed. Ra is calculated from Equation (1) in a region of 0.6 µm-0.6 µm of the obtained plane image.

$$Ra = \frac{1}{LxLy} \int_0^{Ly} \int_0^{Lx} |f(x, y)| dx dy \qquad \text{Equation 1}$$

Here, the abbreviations in Equation (1) have the following meanings.

f(x, y): Height difference between the actual surface and the center surface.

Lx, Ly: The size of the XY plane.

The "center surface" is a plane which is parallel to the plane where the height deviation from the actual surface is the minimum and which divides the actual surface in two with the same volume.

The height difference (Rp-v) between the highest portion and the lowest portion of the surface roughness of the carbon fiber a is preferably 5 to 30 nm, and more preferably 5 to 25 nm. When the height difference (Rp-v) is in the above range, the impregnation property of the matrix resin composition is sufficient and it is easy to suppress the fractures starting from the interface between the carbon fiber and the resin.

The height difference (Rp-v) is determined by reading the height difference between the highest portion and the lowest portion in a range of 0.6 µm×0.6 µm of the plane image of the cross-section from which the curvature of the carbon fiber is removed in the Ra measurement.

The closer the shape of the cross-section perpendicular to the fiber axis direction of the carbon fiber is to a perfect circle, the better the structural uniformity in the vicinity of the fiber surface, the more it is possible to reduce stress concentrations at the interface between the carbon fiber and the resin, and the stronger the adhesion between the carbon fiber and the resin. From this point of view, the ratio of the major axis to the minor axis (major axis/minor axis) of the carbon fibers a is preferably 1.00 to 1.01 and more preferably 1.00 to 1.005.

The ratio (major axis/minor axis) of carbon fibers, which are single fibers, is measured by the following method.

A carbon fiber bundle for measurement is passed through a tube with an inner diameter of 1 mm and cut in round slices to make samples. Next, the sample is adhered to a SEM sample table with the fiber cross-section facing up and Au is further sputtered thereon with a thickness of 10 nm. The fiber cross-section is observed with a scanning electron microscope under the conditions of an accelerating voltage of 7.00 kV and a working distance of 31 mm and the major axis and the minor axis are measured to calculate the ratio (major axis/minor axis).

The mass of carbon fibers a per unit length is preferably 0.030 to 0.055 mg/m. When the mass per unit length of the carbon fibers is in the above range, the fiber diameter of the carbon fibers is small and structural non-uniformity in the cross-sectional direction which occurs in the carbonizing step during the manufacturing of the carbon fibers is easily reduced.

(Carbon Fiber Bundle A)

The strand strength of the carbon fiber bundle A is preferably 5600 MPa or more, more preferably 5700 MPa or more, and even more preferably 5800 MPa or more. When the strand strength of the carbon fiber bundle A is the lower limit value or more, it is possible to manufacture a molded article having excellent mechanical characteristics.

The strand elastic modulus of the carbon fiber bundle A is preferably 250 to 380 GPa, and more preferably 280 to 350 GPa. When the strand elastic modulus of the carbon fiber bundle is the lower limit value of the above range or more, sufficient mechanical physical properties are easily exhibited. When the strand elastic modulus of the carbon fiber bundle is the upper limit value of the above range or less, the graphite crystal size on the surface and inside of the carbon fiber becomes small and a decrease in the strength in the fiber cross-sectional direction and the compression strength in the fiber axis direction is easily suppressed. Due to this, it is easy to obtain a molded article with an excellent balance between tensile and compressive performance. Further, inactivation due to the increase in the graphite crystal size on the surface of the carbon fiber is suppressed and the adhesion with the resin is improved, thus, the mechanical characteristics of the molded article are improved.

The strand strength and the strand elastic modulus of the carbon fiber bundle are measured by a method in accordance with ASTM D4018.

Carbon fiber bundles with a strand elastic modulus of 250 GPa or more are manufactured by being subjected to a carbonization process at a relatively high temperature. Impurities such as metals may react with carbon or melting may occur at a temperature exceeding 1000° C., which may be a factor causing the formation of defect points in the carbon fibers. The higher the process temperature, the more remarkable the formation of defect points in the carbon fibers, and the more the mechanical characteristics of the molded article using the carbon fibers tend to deteriorate.

Therefore, the content of the metal component in the carbon fiber bundle A is preferably 50 ppm or less in terms of easily manufacturing a molded article having excellent mechanical characteristics. Examples of the metal component include metals such as alkali metal, alkaline earth metal, zinc, iron, and aluminum.

The content of the metal component in the carbon fiber bundle is measured by the following method.

5 g of a carbon fiber bundle is weighed into a platinum crucible and heated on a hot plate until no smoke is generated (preliminary heat treatment), and then the carbon fiber bundle is incinerated at 600° C. in a muffle furnace (incinerating treatment). After incinerating, while heating on a hot plate, 2 mL of a hydrochloric acid aqueous solution in which concentrated hydrochloric acid: pure water (mass ratio)=1:1 is added to the crucible to dissolve the ash, and further heated to concentrate the dissolved solution of the ash until before during and solidification (dissolution concentration treatment) This concentrate is dissolved in a 0.1 mol/L hydrochloric acid aqueous solution and a set volume of 10 mL thereof is used as a measurement sample (sample treatment). Using the measurement sample, the amount of each metal is measured by ICP emission spectrometry and the content of the metal component is calculated.

When manufacturing a carbon fiber bundle, generally, an oil solution containing silicone oil is attached to a precursor fiber bundle before a stabilization treatment. Since silicone oil has excellent heat resistance and is able to impart excellent mold releasability, silicone oil is optimal as an oil solution when treating a multifilament bundle, in which a large number of filaments with a small filament diameter are gathered, at a high temperature of 200° C. or higher for several tens of minutes to several hours. In addition, in the carbonization treatment carried out after the stabilization treatment, the majority of the silicone oil is decomposed and scattered, thus, the amount of the silicone compound remaining in the carbon fiber bundle is very small. However, when the silicone compound remains near the surface layer of the carbon fiber, this is a factor causing the formation of defect points.

The amount of Si in the carbon fiber bundle A is preferably 270 ppm or less and more preferably 200 ppm or less in that it is possible to reduce the defect points of the carbon fibers, the interfacial adhesion between the carbon fibers and the resin is excellent, and it is possible to easily obtain a molded article having excellent mechanical characteristics.

The Si amount in the carbon fiber bundle is measured by the following method.

The carbon fiber bundle sample is placed in a platinum crucible known as a tare and incinerated at 600 to 700° C. in a muffle furnace, and the mass thereof is measured to determine the ash content. Next, a specified amount of sodium carbonate is added thereto and melted with a burner, the volume is set in a 50 mL poly measuring flask while being dissolved in DI (deionized) water, and the Si is quantified by ICP emission spectrometry.

The knot tenacity of the carbon fiber bundle A is preferably 760 $N/mm^2$ or more, more preferably 800 $N/mm^2$ or more, and even more preferably 850 $N/mm^2$ or more.

The knot tenacity of the carbon fiber bundle is a value obtained by dividing the tensile breaking stress of the knotted carbon fiber bundle by the cross-sectional area of the carbon fiber bundle. The cross-sectional area of the carbon fiber bundle is determined from the mass and density per unit length of the carbon fiber bundle. The knot tenacity may be an index which reflects the mechanical characteristics of the carbon fiber bundle other than in the fiber axis direction, and in particular, it is possible to easily determine the properties in the direction perpendicular to the fiber axis direction.

In a molded article using a prepreg, the prepreg is often laminated in a quasi-isotropic sequence and a complicated stress field is formed. At that time, in addition to the tensile and compressive stresses in the fiber axis direction, stresses are also generated in a direction different from the fiber axis direction. Further, in a case where a relatively high-speed strain such as an impact test is applied, the state of the stress generated inside the material is quite complicated and the strength in a direction different from the fiber axis direction is important. When the knot tenacity of the carbon fiber bundle is the lower limit value or more, sufficient mechanical characteristics are easily exhibited even in a molded article obtained by laminating prepregs in a pseudo isotropic manner.

The knot tenacity of the carbon fiber bundle is measured by the following method.

A grip portion with a length of 25 mm is attached to both ends of an untwisted carbon fiber bundle with a fiber length of 150 mm to make a specimen. When producing the specimen, a load of $0.1 \times 10^{-3}$ N/denier is applied to arrange the form of the carbon fiber bundle. One knot is formed at the central section of the specimen, a tensile test is performed with a crosshead speed of 100 mm/min during tension, and the tensile breaking stress is measured. The test is carried out on 12 specimens, the minimum value and maximum value of the tensile breaking stress are removed, and the average of the measured values for 10 specimens is taken as the tensile breaking stress. The knot tenacity is calculated by dividing the determined tensile breaking stress by the cross-sectional area of the carbon fiber bundle.

The density of the carbon fiber bundle is measured according to the C method (density gradient column method) described in JIS R7603. The density gradient column method is a method for reading the equilibrium position of a test piece in a liquid pipe having a linear density gradient.

The ipa value on the surface of the carbon fiber bundle A is preferably 0.14 μA/cm$^2$ or more, and more preferably 0.16 μA/cm$^2$ or more from the viewpoint of the impregnation property. The ipa value on the surface of the carbon fiber bundle A is preferably 0.20 μA/cm$^2$ or less, and more preferably 0.19 μA/cm$^2$ or less from the viewpoint of strength.

The ipa value is influenced by the quantity of oxygen-containing functional groups in the carbon fiber bundle, the surface roughness Ra involved in the formation of the electric double layer, and the fine structure. In particular, the ipa value becomes large in the case of carbon fibers heavily etched on the surface layer or carbon fibers forming an intercalation compound in which anions penetrated between layers in the graphite crystals. In the molded article exhibiting excellent mechanical characteristics, the interface between the carbon fiber and the resin is important and, in particular, a carbon fiber having a surface in which an appropriate quantity of oxygen-containing functional groups is present so as to form a small electric double layer forms a very suitable interface.

When the ipa value is the lower limit value of the above range or more, the quantity of oxygen-containing functional groups is sufficient, and the interfacial adhesion between the carbon fiber and the resin is improved. When the ipa value is the upper limit value of the above range or less, the etching of the surface of the carbon fiber is appropriate and the formation of the intercalation compound is suppressed, thus, the surface of the carbon fiber is suppressed from becoming fragile and interfacial adhesion between the carbon fiber and the resin is improved. However, even if the ipa value of the carbon fiber is the lower limit value or more, in a case of a resin having a low impact strength, fractures starting from the resin in the composite material are easily generated and it is not possible to sufficiently utilize the interfacial adhesion between the carbon fiber and the resin. That is, when combining carbon fiber having high interfacial adhesion with a resin having high impact strength, it is possible to obtain a high-strength composite material which sufficiently utilizes the interfacial adhesion.

The ipa of the carbon fiber bundle is measured by the following electrochemical measurement method (cyclic voltammetry).

A 5% by mass phosphoric acid aqueous solution (pH 3) is bubbled with nitrogen to remove the influence of dissolved oxygen to obtain an electrolytic solution. A carbon fiber bundle of a plurality of filaments having a fiber length of 40 mm is set as a sample, the carbon fiber bundle is set as one electrode, a platinum electrode having a sufficient surface area is set as a counter electrode, and an Ag/AgCl electrode is set as a reference electrode and immersed in an electrolytic solution. The scanning range of the potential applied between the carbon fiber electrode and the platinum electrode is −0.2 V to +0.8 V, the scanning speed is 20.0 mV/sec, and a current-voltage curve is drawn by an X-Y recorder. At a stage when the curve is stabilized by sweeping three times or more, the current value I is read with the potential at +0.4 V with respect to the reference electrode as the reference potential, and the ipa value is calculated according to Equations (2) and (3).

$$ipa = \frac{I}{A} = \frac{I}{\sqrt[8]{\frac{\pi K M}{\sigma}}} \qquad \text{Equation 2}$$

$$A = \frac{8}{10}\sqrt{\frac{\pi K M}{\sigma}} \qquad \text{Equation 3}$$

Here, the abbreviations in Equations (2) and (3) have the following meanings.

A: Surface area of the sample carbon fiber bundle (cm$^2$).
K: Number of filaments of the sample carbon fiber bundle (threads).
M: Mass per unit length of the sample carbon fiber bundle (g/m).
σ: Density of the sample carbon fiber bundle (g/cm$^3$).

For the surface area of the carbon fiber bundle, it is possible to use the apparent surface area calculated from the fiber length and density of the carbon fiber bundle and the mass per unit length of the sample carbon fiber bundle.

In the present invention, preferably, the quantity of oxygen-containing functional groups ($O_{1S}/C_{1S}$) on the surface of the carbon fiber bundle A is 0.070 to 0.130, and the quantity of nitrogen-containing functional groups ($N_{1S}/C_{1S}$) is 0.065 to 0.100, and more preferably, $O_{1S}/C_{1S}$ is 0.080 to 0.110, and $N_{1S}/C_{1S}$ is 0.070 to 0.085. When $O_{1S}/C_{1S}$ and $N_{1S}/C_{1S}$ are the lower limit value of the above range or more, the quantity of functional groups on the surface is sufficient and the interfacial adhesion between the carbon fiber and the resin is improved. When $O_{1S}/C_{1S}$ and $N_{1S}/C_{1S}$ are the upper limit value of the above range or less, the surface oxidation treatment does not become excessive and a fragile layer is not easily formed on the carbon fiber surface, thus, the interfacial adhesion between the carbon fiber and the resin is improved.

The quantity of oxygen-containing functional groups ($O_{1S}/C_{1S}$) and the quantity of nitrogen-containing functional groups ($N_{1S}/C_{1S}$) on the surface of the carbon fiber bundle are measured by X-ray photoelectron spectroscopy.

The carbon fiber bundle is placed on a sample table and measured by a typical method in a fixed state and a range in which the oxygen concentration is 538 eV to 524 eV and a range in which the nitrogen concentration is 393 eV to 407 eV are integrated to determine the $O_{1S}$ peak area and the Nis peak area and calculate $O_{1S}/C_{1S}$ and $N_{1S}/C_{1S}$ as the ratio with respect to the $C_{1S}$ peak area.

From the viewpoint of the mechanical characteristics of the molded article when the prepreg is molded, the amount of the sizing agent in the carbon fiber bundle A is preferably 0.02 to 0.50% by mass with respect to the total mass of the carbon fiber bundle and the sizing agent, and more preferably 0.02 to 0.20% by mass. When the attachment amount of the sizing agent is the lower limit value of the above range or more, the carbon fibers are sufficiently bundled and fuzz is not easily generated during the manufacturing of the prepreg, thus, a molded article having excellent mechanical characteristics is easily obtained. When the amount of the sizing agent is the upper limit value of the above range or less, the matrix resin composition is easily impregnated in the carbon fiber base material, thus, a molded article having excellent mechanical characteristics is easily obtained.

(Method for Manufacturing Carbon Fiber Bundle A)

The method for manufacturing the carbon fiber bundle A is not particularly limited, and examples thereof include methods having the following steps (a) to (g).

(a) A spinning dope is spun and solidified to obtain a coagulated fiber.
(b) The coagulated fiber is washed and drawn to obtain a process fiber bundle.
(c) An oil solution is attached to the process fiber bundle and dry-densified to obtain an acrylic precursor fiber bundle.
(d) The acrylic precursor fiber bundle is subjected to a stabilization treatment to obtain a stabilized fiber bundle.
(e) The stabilized fiber bundle is subjected to a carbonization treatment to obtain a carbon fiber bundle.
(f) A surface oxidation treatment is carried out on the carbon fiber bundle.
(g) A sizing agent is attached to the carbon fiber bundle after the surface oxidation treatment.

The spinning dope used in step (a) is obtained by dissolving the raw material of the carbon fiber in an organic solvent.

The raw material of the carbon fiber is not particularly limited, and an acrylonitrile-based polymer is preferable in terms of exhibiting mechanical characteristics. The acrylonitrile-based polymer is a polymer having 96% by mass or more of repeating units derived from acrylonitrile, and a polymer having 97% by mass or more of repeating units derived from acrylonitrile is preferable.

In a case where the acrylonitrile-based polymer is a copolymer, examples of the copolymerization component other than acrylonitrile include acrylic acid derivatives such as acrylic acid, methacrylic acid, itaconic acid, methyl acrylate, and methyl methacrylate, acrylamide derivatives such as acrylamide, methacrylamide, N-methylolacrylamide, and N,N-dimethylacrylamide, vinyl acetate, and the like. The copolymerization component may be one or more types. As the copolymerization component, a monomer having one or more carboxyl groups is preferable.

The polymerization method for manufacturing an acrylonitrile-based polymer is not particularly limited, and examples thereof include redox polymerization in an aqueous solution, a suspension polymerization in a heterogeneous system, an emulsion polymerization using a dispersant, and the like.

Examples of the organic solvent used in the spinning dope include dimethylacetamide, dimethyl sulfoxide, dimethylformamide, and the like. Since these organic solvents do not include a metal component, it is possible to reduce the content of the metal component in the obtained carbon fiber bundle.

The solid content concentration of the spinning dope is preferably 20% by mass or more.

The spinning method may be either wet spinning or dry-wet spinning. For example, in dry-wet spinning, a spinning dope is briefly spun in the air from a spinning ejection holes, in which a large number of discharge holes are arranged, and then coagulated by immersion in a temperature-controlled congealed liquid, and a large number of formed filaments are brought together and taken as a coagulated fiber.

The congealed liquid is a mixed solution of an organic solvent and water, and it is possible to use known solutions.

In step (b), the coagulated fiber obtained in step (a) are washed and drawn to form a process fiber bundle.

The washing method may be any method as long as it is possible to remove the solvent from the solidified thread and it is possible to adopt a known method.

Before washing the solidified thread, it is possible to form a dense fibril structure by drawing the solidified thread in a drawing tank accommodating a drawing liquid having a lower solvent concentration and a higher temperature than the solidifying solution.

The solvent concentration of the drawing liquid is preferably 30 to 80% by mass, and more preferably 30 to 78% by mass, in terms of easily ensuring stable drawability.

The temperature of the drawing liquid is preferably 40 to 92° C. When the temperature of the drawing liquid is the lower limit value of the above range or more, it is easy to ensure drawability and easy to form a uniform fibril structure. When the temperature of the drawing liquid is the upper limit value of the above range or less, the plasticizing action due to heat does not become excessively large, the solvent removal on the surface of the thread does not easily proceed rapidly, and the drawing becomes uniform, thus, the quality of the acrylic precursor fiber bundle obtained in the subsequent step is improved.

The draw ratio in the drawing tank is preferably 2 to 4 times. When the draw ratio in the drawing tank is the lower limit value of the above range or more, it is easy to form a desired fibril structure. When the draw ratio in the drawing tank is the upper limit value of the above range or less, the fibril structure itself does not easily break and it is easy to suppress the structural form of the acrylic precursor fiber bundle obtained in the subsequent step from becoming sparse.

In addition, after washing the solidified thread, it is possible to further improve the fiber orientation by drawing the process fiber bundle in a swollen state without a solvent in hot water, and it is also possible to reduce the strain of drawing by adding some relax thereto.

The temperature of hot water is preferably 75 to 98° C.

The draw ratio in hot water is preferably 1.1 to 2.0 times.

In step (c), an oil solution is attached to the process fiber bundle obtained in step (b) and dry-densified to obtain an acrylic precursor fiber bundle.

As the oil solution, it is possible to use known oil solutions, and examples thereof include oil solutions formed of silicone-based compounds such as silicone oil.

The amount of the oil solution to the process fiber bundle is preferably 0.8 to 1.6% by mass with respect to the total mass of the process fiber bundle and the oil solution.

For the dry-densification, the process fiber bundle to which the oil solution is attached may be densified by drying by a known drying method, without particular limitation. As the drying in the dry-densification, a method for passing the process fiber bundle to which the oil solution is attached through a plurality of heating rolls while being brought into contact therewith is preferable.

As necessary, the acrylic precursor fiber bundle after dry-densification may be drawn to 1.8 to 6.0 times in pressurized steam at 130 to 200° C. or in a dry heat medium, or between heating rolls or on a heating plate and further orientation improvement and densification may be performed.

In step (d), the acrylic precursor fiber bundle obtained in step (c) is subjected to a stabilization treatment to obtain a stabilized fiber bundle.

Examples of the stabilization treatment include a method for passing an acrylic precursor fiber bundle through a hot air circulation type stabilization oven at 220 to 260° C. such that the passage time is 30 to 100 minutes.

The stabilization reaction includes a cyclization reaction by heat and an oxidation reaction by oxygen, and it is important to balance these two reactions. In order to balance these two reactions, the stabilization treatment time is preferably 30 to 110 minutes, and more preferably 40 to 100 minutes. When the stabilization treatment time is the lower limit value of the above range or more, a portion where the oxidation reaction does not occur does not easily remain inside the single fiber, thus, structural roughness does not easily occur in the cross-sectional direction of the single fiber. Therefore, it is easy to obtain a carbon fiber bundle having a uniform structure and excellent mechanical characteristics. When the stabilization treatment time is the upper limit value of the above range or less, it is possible to reduce the quantity of oxygen present in a portion near the surface of the single fiber, and the forming of defect points is suppressed due to the excess oxygen disappearing in the heat treatment at high temperatures thereafter, thus, it is easy to obtain a high-strength carbon fiber bundle.

In the stabilization treatment, an elongation operation is performed as necessary. Appropriately performing the elongation in the stabilization treatment makes it possible to maintain or improve the orientation of the fibril structure forming the fiber and to easily obtain a carbon fiber bundle having excellent mechanical characteristics.

The elongation ratio in the stabilization treatment is preferably 6% or less, and more preferably −10 to 3%. When the elongation ratio is the lower limit value of the above range or more, it is easy to maintain or improve the orientation of the fibril structure forming the fiber. When the elongation ratio is the upper limit value of the above range or less, the fibril structure itself does not easily break and the subsequent structure formation of carbon fibers is not easily impaired, thus, it is easy to obtain a high-strength carbon fiber bundle.

The density of the stabilized fiber bundle after the stabilization treatment is preferably 1.335 to 1.370 g/cm, and more preferably 1.340 to 1.360 g/cm. When the density of the stabilized fiber bundle is the lower limit value of the above range or more, it is possible to suppress the formation of defect points due to a decomposition reaction caused by a subsequent heat treatment at a high temperature, thus, it is easy to obtain a high-strength carbon fiber bundle. When the density of the stabilized fiber bundle is the upper limit value of the above range or less, it is possible to reduce the oxygen content of the fiber, and the forming of defect points due to the excess oxygen disappearing in the heat treatment at high temperatures thereafter is suppressed, thus, it is easy to obtain a high-strength carbon fiber bundle.

In step (e), the stabilized fiber bundle obtained in step (d) is carbonized to obtain a carbon fiber bundle.

Examples of the carbonization treatment include a treatment including a first carbonization treatment in which heat treatment is performed in a carbonization furnace having a temperature gradient of 300° C. to 800° C. in an inert atmosphere such as nitrogen, and a second carbonization treatment in which heat treatment is performed in a carbonization furnace having a temperature gradient of 1000° C. to 1600° C. in an inert atmosphere such as nitrogen.

The temperature gradient in the first carbonization treatment is preferably a linear gradient of 300 to 800° C., and more preferably a linear gradient of 300 to 750° C. In consideration of the temperature of the flame resistance step, the start temperature of the first carbonization treatment is preferably 300° C. or higher. When the maximum temperature of the first carbonization treatment is 800° C. or lower, it is easy to suppress the processed fiber from becoming fragile. The temperature gradient does not have to be a linear gradient.

The treatment time for the first carbonization treatment is preferably 1.0 to 3.0 minutes. When the treatment time of the first carbonization treatment is the lower limit value or more, the decomposition reaction due to a rapid temperature rise does not easily occur and it is easy to obtain a high-strength carbon fiber bundle. When the treatment time of the first carbonization treatment is the upper limit value or less, an influence due to plasticization in the former step is not easily generated and a decrease in crystal orientation is suppressed, thus, it is easy to obtain a carbon fiber bundle having excellent mechanical characteristics.

In the first carbonization treatment, it is preferable to carry out an elongation operation in terms of easily maintaining the orientation of the fibril structure.

The elongation ratio in the first carbonization treatment is preferably 2 to 7%, and more preferably 3 to 5%. When the elongation ratio in the first carbonization treatment is the lower limit value of the above range or more, the orientation of the fibril structure is easily maintained, thus, it is easy to obtain a carbon fiber bundle having excellent mechanical characteristics. When the elongation ratio in the first carbonization treatment is the upper limit value of the above range or less, the fibril structure itself does not easily break and the subsequent carbon fiber structure formation is not easily impaired, thus, it is easy to obtain a high-strength carbon fiber bundle.

The temperature gradient in the second carbonization treatment is preferably a linear gradient of 1000° C. to 1600° C., and more preferably a linear gradient of 1050° C. to 1600° C. The temperature gradient in the second carbonization treatment does not have to be a linear gradient.

It is possible to set the temperature in the second carbonization treatment according to the desired strand elastic modulus determined for the carbon fiber bundle.

In order to obtain carbon fibers having excellent mechanical characteristics, the maximum temperature of the second carbonization treatment is preferably low. Lowering the maximum temperature and lengthening the treatment time in the second carbonization treatment makes it easy to obtain a carbon fiber bundle having a high strand elastic modulus. In addition, when the treatment time is lengthened, it is possible to lower the temperature gradient, thus, there is also an effect of suppressing the formation of defect points.

The treatment time in the second carbonization treatment is preferably 1.3 to 5.0 minutes.

In the second carbonization treatment, the processed fibers are accompanied by a large shrinkage, thus, it is preferable to perform the heat treatment in a pulled state to a certain extent. In the second carbonization treatment, the processed fiber is preferably set to a pulled state to the extent that, with respect to a distance between any two points in a state where the process fiber is linearized without being elongated, the distance between the two points is shortened in a range of 0 to 6%. When the processed fibers are loosened more than this, the crystal orientation in the fiber axis direction deteriorates. In addition, when the processed fibers are elongated in the second carbonization treatment, the structures formed so far are easily destroyed and defect points are easily formed, and the strength of the obtained carbon fiber bundle is decreased.

After the second carbonization treatment, as necessary, a third carbonization treatment having a desired temperature gradient may be additionally performed.

In step (f), the carbon fiber bundle is subjected to a surface oxidation treatment.

As the surface oxidation treatment method, it is possible to adopt a known method, and examples thereof include electrolytic oxidation, chemical oxidation, air oxidation, and the like. Among these, electrolytic oxidation, which is widely practiced industrially, is preferable in terms of more stable surface oxidation treatment being possible.

In order to adjust the ipa value of the carbon fiber bundle to the preferable range, it is most convenient to adjust the amount of electricity using an electrolytic oxidation treatment. In the electrolytic oxidation treatment, even if the amount of electricity is the same, the ipa value changes depending on the type and concentration of the electrolyte. In a case of an electrolytic oxidation treatment of carbon fiber bundles, in order to adjust the ipa value of the carbon fiber bundles to the preferable range, in an alkaline aqueous solution having a pH greater than 7, the carbon fiber bundles are preferably subjected to an oxidation treatment by applying an amount of electricity of 10 to 300 coulombs/g thereto as an anode. From the viewpoint of improving interfacial adhesion, 60 coulombs/g or more is more preferable, and 90 coulombs/g or more is even more preferable. In addition, from the viewpoint of manufacturing stability, 250 coulombs/g or less is more preferable, and 150 coulombs/g or less is even more preferable.

As the electrolyte, ammonium carbonate, ammonium bicarbonate, calcium hydroxide, sodium hydroxide, and potassium hydroxide are preferable.

In step (g), a sizing agent is attached to the carbon fiber bundle after the surface oxidation treatment.

As the sizing agent, it is possible to use a known sizing agent. A solution in which a sizing agent is dissolved in an organic solvent or an emulsion liquid dispersed in water with an emulsifier or the like is coated on a carbon fiber bundle by a roller immersion method, a roller contact method, or the like, and dried to attach the sizing agent.

It is possible to carry out the adjustment of the amount of the sizing agent to the carbon fiber bundle by adjusting the concentration of the sizing agent in the solution or emulsion liquid, or by adjusting the squeezing amount after coating.

The drying method after coating the sizing agent is not particularly limited, and for example, it is possible to perform the drying using hot air, a hot plate, a heating roller, various infrared heaters, and the like.

(Matrix Resin Composition)

The matrix resin composition is a resin composition which satisfies Condition 1 below.

Condition 1: The impact strength of the film obtained by solidifying the matrix resin composition under the molding conditions below is 12.0 kJ/m or more. The impact strength is a value measured in the following Impact Test.

(Molding Conditions)

The matrix resin composition is extruded and drawn such that a draw ratio is 1.1 times, and brought into contact for three seconds with a roll temperature-controlled to a temperature of (Tm −125°) C in a case where the crystal melting enthalpy ΔHm of the matrix resin composition is 10 J/g or more, or to a temperature of (Tg −30°) C in a case where the crystal melting enthalpy ΔHm of the matrix resin composition is less than 10 J/g, and a film having a thickness of 40 to 60 μm is obtained. Here, Tg and Tm are respectively a glass transition temperature and a melting point in differential scanning calorimetry (DSC) in accordance with ISO11357.

(Impact Test)

A test piece of 100 mm in length×100 mm in width is cut out from the film, the test piece is fixed with a clamp, a striking core with a ½ inch diameter is dropped at a falling speed of 3 m/sec on a center of the test piece under conditions of a temperature of 23° C. to apply an impact thereto, and the impact absorption energy when the test piece is fractured is measured and divided by the film thickness to obtain the impact strength of the film.

As the matrix resin composition, a resin composition having an impact absorption energy of 0.7 J or more in a film having a thickness of 100 μm formed using the matrix resin composition is preferable, and a resin composition having an impact absorption energy of 1.0 J or more is more preferable.

In addition, the matrix resin composition is preferably a matrix resin composition having an impact strength of 12.0 kJ/m or more measured in the impact test for a film F described below, more preferably a matrix resin composition having an impact strength of 15.0 kJ/m or more, and even more preferably a matrix resin composition having an impact strength of 15.2 kJ/m or more. When the matrix resin composition has an impact strength of the lower limit value or more, the interfacial adhesion between the carbon fiber and the resin is superior. The impact strength of the matrix resin composition is preferably 30.0 kJ/m or less, and more preferably 20.0 kJ/m or less.

That is, the matrix resin composition preferably satisfies Condition 2 below, and more preferably satisfies Condition 4 below.

Condition 2: The impact strength is 12.0 kJ/m or more and 20.0 kJ/m or less.

Condition 4: The impact strength is 15.2 kJ/m or more.

The film F is molded by the following method. The matrix resin composition is extruded and drawn such that a draw ratio is 1.1 times, and brought into contact for three seconds with a roll temperature-controlled to a temperature of (Tm −125°) C in a case where the crystal melting enthalpy ΔHm of the matrix resin composition is 10 J/g or more, or to a temperature of (Tg −30°) C in a case where the crystal melting enthalpy ΔHm of the matrix resin composition is less than 10 J/g, and a film having a thickness of 40 to 60 μm is obtained. Here, Tg is the glass transition temperature and Tm is the melting point.

It is possible to measure the glass transition temperature Tg and melting point Tm of the film F by differential scanning calorimetry (DSC) in accordance with ISO11357.

In the impact test of film F, a test piece of 100 mm in length×100 mm in width is cut out from the film, the test piece is fixed with a clamp, a striking core with a ½ inch diameter is dropped at a falling speed of 3 m/sec on a center of the test piece under conditions of a temperature of 23° C. to apply an impact thereto, and the impact absorption energy when the test piece is fractured is measured and divided by the film thickness to obtain the impact strength of the film.

It is possible to measure the crystal melting enthalpy ΔHm of the matrix resin composition by differential scanning calorimetry (DSC) in accordance with ISO11357.

For the tear strength of the film F, the tear strength in the MD direction and the TD direction measured by the method specified in JIS K7128 (C method) are both preferably 1200 N/mm or more, and more preferably 2300 N/mm or more.

That is, the matrix resin composition preferably satisfies Condition 3 below, and more preferably Condition 5 below.

Condition 3: When the matrix resin composition is drawn such that a draw ratio is 1.1 times and is made into a film having a thickness of 40 to 60 m, a tear strength of the film measured by the method specified in JIS K7128 (C method) in both a MD direction and a TD direction is 1200 N/mm or more.

Condition 5: When the matrix resin composition is made into a film having a thickness of 40 to 60 μm drawn such that a draw ratio is 1.1 times, the tear strength of the film measured by the method specified in JIS K7128 (C method) in both a MD direction and a TD direction is 2300 N/mm or more.

It is possible to use a thermosetting resin or a thermoplastic resin as the resin included in the matrix resin composition, but a thermoplastic resin is preferable from the viewpoint of the bending strength in the direction perpendicular to the fiber (90°) and the interlayer fracture toughness. Examples of the thermoplastic resin include a polyimide resin, a polyamide resin, a polyphenylene sulfide resin, a polyetherimide resin, a polyether sulfone resin, a polyarylketone resin, and the like. Among the above, a polyarylketone resin is preferable from the viewpoint of mechanical properties. The resin included in the matrix resin composition may be one or more types.

(Polyarylketone Resin)

The polyarylketone resin included in the matrix resin is a thermoplastic resin including an aromatic nucleus bond, an ether bond and a ketone bond in the structural unit thereof, and typical examples thereof include polyetherketone, polyetheretherketone, polyetherketoneketones, and the like; however, in the fiber-reinforced resin prepreg of the present invention, polyetheretherketone having a structural unit represented by Formula (4) is preferably used. From the viewpoint of toughness, preferably, the polyarylketone resin has a branched chain structure, or the melt volume rate (MVR; set temperature: 380° C., load: 5 kg) measured according to ISO1133 is 1 to 80 cm³/10 min.

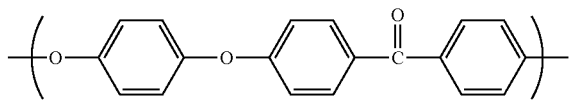

Formula 4

The ratio of the structural unit represented by Formula (4) to the polyetheretherketone (100% by mass) having the structural unit represented by Formula (4) is preferably 70% by mass to 100% by mass, more preferably 80% by mass to 100% by mass, and particularly preferably 90% by mass to 100% by mass.

The content ratio of the polyarylketone resin in the matrix resin (100% by mass) included in the fiber-reinforced resin prepreg of the present invention is preferably 75% by mass or more, and more preferably 85% by mass or more.

The polyarylketone resin included in the matrix resin of the fiber-reinforced resin prepreg of the present invention preferably has a crystal melting peak temperature of 260° C. or higher from the viewpoint of heat resistance.

It is possible to measure the crystal melting peak temperature by differential scanning calorimetry (DSC).

The polyarylketone resin included in the matrix resin of the fiber-reinforced resin prepreg of the present invention may include a polyarylketone resin other than the polyetheretherketone having the structural unit represented by Formula (4). Examples of such a polyarylketone resin include a polyetherketoneketone resin. Examples thereof include "Kepstan (registered trademark) 7002" manufactured by Arkema.

As the polyarylketone resin included in the matrix resin of the fiber-reinforced resin prepreg of the present invention, one type may be used alone, or two or more types may be used in combination.

The matrix resin composition may include components other than the thermoplastic resin as long as the properties are not impaired. Examples of other components include various additives other than inorganic fillers such as heat stabilizers, ultraviolet absorbers, light stabilizers, nucleating agents, colorants, lubricants, and flame retardants. The other components may be one or more types.

The method for mixing the other components is not particularly limited, and it is possible to adopt a known method.

Generally, in a case where the average molecular weight of the thermoplastic resin is low and the viscosity is relatively low, specifically, with a PEEK resin composition, with a resin in which the MVR (380° C., 5 kg) specified in ISO1133 is 10 cm³/10 min or more, it is easy to manufacture the prepreg. On the other hand, in a case where the average molecular weight is high and the viscosity is relatively high, specifically, with a PEEK resin composition, with a resin having the MVR of 150 cm/10 min or less, the properties of the molded article obtained by using this prepreg are excellent.

(Prepreg Form)

The thickness of the prepreg is preferably 0.04 to 0.7 mm, and more preferably 0.07 to 0.4 mm in terms of the residual stress during molding.

The fiber volume content (Vf) of this prepreg is preferably 20 to 75% by volume, and more preferably 40 to 65% by volume, in terms of high elasticity and high strength.

The volume content (Vr) of the resin in this prepreg is preferably 25 to 80% by volume, and more preferably 35 to 60% by volume, in terms of high elasticity and high strength.

As the prepreg, a UD prepreg, in which a matrix resin composition is impregnated in a carbon fiber base material in a fiber form in which carbon fiber bundles are oriented unidirectionally, is preferable.

It is possible to use the prepreg as a molding material (intermediate material) for manufacturing various molded articles (composite materials). Depending on the application, use is possible as a laminate in which the fiber axis directions of the carbon fiber bundles of each prepreg are laminated at various angles. In addition, in order to improve the moldability, it is possible to make the prepreg into a notched prepreg in which a notch is processed, or into a random sheet in which rectangular or parallelogram chopped strands are set and the chopped strands are randomly dispersed isotropically or anisotropically.

(Method for Manufacturing Prepreg)

The method for manufacturing the prepreg is not particularly limited. A method may be used in which resin fibers or resin particles formed by using the matrix resin composition are added to a carbon fiber base material and heated and melted to impregnate the matrix resin composition therein and remove air from between the fibers. In a case where the resin fibers of the matrix resin composition are used, the fiber diameter of the resin fibers is preferably 5 to 50 μm. In a case where the resin particles of the matrix resin composition are used, the average particle diameter of the resin particles is preferably 10 to 100 μm. Other examples include a method in which the film f formed by using the matrix resin composition is superposed on the carbon fiber base material, heated and melted to impregnate the matrix resin composition therein, and the air is removed from between the fibers.

(Form of Prepreg Film f)

The thickness of the film f of the matrix resin composition is preferably 10 to 100 μm. The film f may be a non-drawn film or a drawn film, and a non-drawn film is preferable in terms of excellent secondary processability. The non-drawn film includes a film having a draw ratio of less than 2 times.

(Method for Manufacturing Film f for Prepreg)

The method for manufacturing the prepreg film f is not particularly limited, and it is possible to adopt a known method. Examples thereof include a method in which the material used for the matrix resin composition is melt-kneaded, then extruded into a film shape and cooled.

It is possible to use a known kneader such as a single-screw or twin-screw extruder for melt-kneading. It is possible to perform extrusion molding, for example, using a mold such as a T-die.

It is possible to appropriately adjust the melting temperature according to the type and mixing ratio of the resin, the presence or absence and the type of additives, and, in terms of being excellent in productivity, 340 to 400° C. is preferable in a case of a PEEK resin, and 360 to 390° C. is more preferable.

Examples of cooling include a method of being brought into contact with a cooler such as a cooled cast roll.

The cooling temperature may be a lower temperature than the melting temperature, and in the case of a PEEK resin, which is a crystalline resin, 200 to 230° C. is preferable, and 200 to 220° C. is more preferable in the case of crystallization. In the case of no crystallization, 80 to 160° C. is preferable, and 100 to 140° C. is more preferable. The crystallized film has a small shrinkage during prepreg manufacturing while the non-crystallized film has excellent productivity and it is possible to use these films as appropriate.

[Molded Article]

The molded article of the present invention is a molded article obtained by molding a molding material including the prepreg.

The molded article of the present invention is preferably a molded article obtained by molding a molding material using only the prepreg. The molded article of the present invention may be a molded article obtained by molding the prepreg and a molding material using a prepreg other than the prepreg.

The laminated configuration of the prepreg in the laminate is not particularly limited. Examples of the laminate including the prepreg include a unidirectional material in which the fiber axis directions of the carbon fiber bundles of each prepreg are aligned, an orthogonal laminated material in which the fiber axis directions of the carbon fiber bundles of each prepreg are orthogonal to each other, and a pseudo isotropic laminated material in which the fiber axis direction of the carbon fiber bundle of each prepreg is pseudo isotropic.

It is possible to appropriately set the number of prepregs laminated in the laminate according to the thickness of the prepreg and the thickness determined for the molded article.

It is possible to appropriately set the shape and dimensions of the molded article of the present invention according to the application.

The method for manufacturing the molded article of the present invention is not particularly limited, and examples thereof include a method for molding a molding material including the present prepreg by a mold pressing method, an autoclave method, a hot/cold pressing method, or the like. Examples of the prepreg laminating method include an automatic laminating method utilizing a robot, and the like.

As described above, in the present invention, the prepreg is used which combines a carbon fiber bundle constituted of carbon fibers having a fiber bundle ipa value in a specific range and a matrix resin composition having an impact strength of 12.0 k/m or more when used as the film F. Using such a prepreg makes it possible to obtain a molded article having excellent mechanical characteristics.

EXAMPLES

A specific description will be given below of the present invention with reference to Examples, but the present invention is not limited to the following description.

(Method for Measuring Carbon Fibers a and Carbon Fiber Bundle A)

[Average Roughness Ra and Height Difference (Rp-v)]

Several carbon fibers constituting a carbon fiber bundle were taken out and placed on a sample table, both ends of the carbon fibers were fixed, and dotite was applied to the periphery thereof to make a measurement sample.

As an atomic force microscope, "SPI3700/SPA-300" manufactured by Seiko Instruments Inc., was used, and a cantilever made of silicon nitride was used. Using an atomic force microscope, in AFM mode, scanning was repeatedly carried out while gradually shifting a cantilever in a range of 600 nm in the direction (circumferential direction) perpendicular with respect to the fiber axis direction on the surface of the carbon fiber of the measurement sample, over a length of 600 nm in the fiber axis direction. Low-frequency components were cut out from the obtained measured image with a two-dimensional Fourier transform and then an inverse transform was performed to obtain a plane image of a cross-section in which the curvature of the carbon fibers was removed. Ra was calculated from Equation (1) in a region of 0.6 μm×0.6 μm of the obtained plane image.

$$Ra = \frac{1}{LxLy} \int_0^{Ly} \int_0^{Lx} |f(x, y)| dx dy \qquad \text{Equation 1}$$

Here, the abbreviations in Equation (1) have the following meanings.

f(x, y): Height difference between the actual surface and the center surface.

Lx, Ly: The size of the XY plane.

In addition, the height difference between the highest portion and the lowest portion in the range of 0.6 μm×0.6 μm of the plane image was read and set as the height difference (Rp-v).

[Ipa Value]

The ipa value was measured using a cyclic voltammetry measuring instrument HZ-3000 manufactured by Hokuto Denko Corporation.

A 5% by mass phosphoric acid aqueous solution (pH 3) was bubbled with nitrogen to remove the influence of dissolved oxygen to obtain an electrolytic solution. A carbon fiber bundle of 12000 filaments having a fiber length of 40 mm was set as a sample, the carbon fiber bundle was set as one electrode, a platinum electrode having a sufficient surface area was set as a counter electrode, and an Ag/AgCl electrode was set as a reference electrode and immersed in an electrolytic solution. The scanning range of the potential applied between the carbon fiber electrode and the platinum electrode was −0.2 V to +0.8 V, the scanning speed was 20.0 mV/sec, and a current-voltage curve was drawn by an X-Y recorder. At a stage when the curve was stabilized by sweeping three times or more, the current value I was read with the potential at +0.4 V with respect to the reference electrode as the reference potential, and the ipa value was calculated according to Equations (2) and (3).

$$ipa = \frac{I}{A} = \frac{I}{\sqrt[8]{\frac{\pi KM}{\sigma}}} \quad \text{Equation 2}$$

$$A = \frac{8}{10}\sqrt{\frac{\pi KM}{\sigma}} \quad \text{Equation 3}$$

Here, the abbreviations in Equations (2) and (3) have the following meanings.

A: Surface area of the sample carbon fiber bundle (cm).
K: Number of filaments of the sample carbon fiber bundle (threads).
M: Mass per unit length of the sample carbon fiber bundle (g/m).
σ: Density of the sample carbon fiber bundle (g/cm$^3$).

For the surface area of the carbon fiber bundle, the apparent surface area calculated from the fiber length and density and the mass per unit length of the carbon fiber bundle was used.

[Quantity of Oxygen-Containing Functional Groups ($O_{1S}/C_{1S}$) and Quantity of Nitrogen-Containing Functional Groups ($N_{1S}/C_{1S}$)]

The carbon fiber bundle was placed on a sample table and measured by X-ray photoelectron spectroscopy in a fixed state, and a range in which the oxygen concentration was 538 eV to 524 eV and a range in which the nitrogen concentration was 393 eV to 407 eV were integrated to determine the $O_{1S}$ peak area and the Nis peak area and calculate $O_{1S}/C_{1S}$ and $N_{1S}/C_{1S}$ as ratios to the $C_{1S}$ peak area.

[Major Axis/Minor Axis]

A carbon fiber bundle for measurement was passed through a tube made of vinyl chloride resin with an inner diameter of 1 mm and then cut in round slices with a knife to prepare a sample. Next, the sample was adhered to the SEM sample table with the fiber cross-section facing upward, Au was further sputtered thereon with a thickness of approximately 10 nm, and then the fiber cross-section was observed by a scanning electron microscope (manufactured by Phillips, product name: XL20) under the conditions of an accelerating voltage of 7.00 kV and a working distance of 31 mm. The major axis and minor axis of the fiber cross-section of the carbon fiber (single fiber) were measured and the ratio of the major axis/minor axis was calculated.

[Strand Strength and Strand Elastic Modulus]

The strand strength and the strand elastic modulus of the carbon fiber bundle were measured by a method in accordance with ASTM D4018.

For the preparation of the strand specimen, production was carried out in accordance with JIS R7601. As the formulation and conditions of the thermosetting epoxy resin, "1)" of Table A.1 of Appendix A was used, and, as the resin impregnation device, the A type of Fig. B.1 of Appendix B was used.

[Content of Metal Components]

5 g of carbon fiber bundles was weighed in a platinum crucible and the platinum crucible was placed on a hot plate and heated until no smoke was generated. Next, the platinum crucible was placed in a muffle furnace and the carbon fiber bundles were incinerated at 600° C. After incineration, while placing the platinum crucible on a hot plate and carrying out heating, 2 mL of a hydrochloric acid aqueous solution of concentrated hydrochloric acid: pure water (mass ratio)=1:1 was added to dissolve the ash, and further heated to concentrate the dissolved solution of the ash until before drying and solidification. This concentrate was dissolved in a 0.1 mol/L hydrochloric acid aqueous solution and a set volume of 10 mL was used as a measurement sample. Using the measurement sample, the content of the metal components was measured by ICP emission spectrometry. An ICP emission spectrometer (IRIS-AP advantage, manufactured by Thermo Electron Co., Ltd.) was used for the ICP emission spectrometry.

[Si Amount]

The carbon fiber bundle sample was placed in a platinum crucible known as a tare and the carbon fiber bundle was incinerated at 600 to 700° C. in a muffle furnace, and the mass thereof was measured to determine the ash content. Next, a specified amount of sodium carbonate was added thereto and melted with a burner, the volume was set in a 50 mL poly measuring flask while being dissolved in DI (deionized) water, and then the Si was quantified by ICP emission spectrometry. An ICP emission spectrometer (IRIS-AP advantage, manufactured by Thermo Electron Co., Ltd.) was used for the ICP emission spectrometry.

[Density]

The density of the carbon fiber bundle was measured according to the C method (density gradient column method) described in JIS R7603. An immersion liquid having a density gradient was produced using xylene and 1,2-dibromoethane.

[Knot Tenacity]

Grip portions with a length of 25 mm were attached to both ends of an untwisted carbon fiber bundle with a fiber length of 150 mm to make a specimen. When producing the specimen, a load of 0.1×10$^3$N/denier was applied to arrange the form of the carbon fiber bundle. One knot was formed at the central section of the specimen, a tensile test was performed with a crosshead speed of 100 mm/min during tension, and the tensile breaking stress was measured. The test was carried out on 12 specimens, the minimum value and maximum value of the tensile breaking stress were removed, and the average of the measured values for 10 specimens was taken as the tensile breaking stress. The knot tenacity was calculated by dividing the determined tensile breaking stress by the cross-sectional area of the carbon fiber bundle. The cross-sectional area of the carbon fiber bundle was determined from the mass and density per unit length of the carbon fiber bundle.

Manufacturing Example 1

A spinning dope was prepared by dissolving an acrylonitrile-based polymer, which was obtained by polymerizing a monomer mixture obtained by mixing acrylonitrile and methacrylic acid at a mass ratio of 98:2, in dimethylformamide so as to have a concentration of 23.5% by mass.

The spinning dope was briefly spun in the air from a spinning ejection holes, in which 2000 discharge holes with a diameter of 0.15 mm were formed, and passed through a space of approximately 5 mm and then solidified by immersion in a 79.0% by mass dimethylformamide aqueous solution (solidifying solution) temperature-controlled to 10° C., and 2000 filaments were brought together and taken as a coagulated fiber.

Next, the coagulated fiber was drawn to 1.1 times in air and then drawn to 2.5 times in a 35% by mass dimethylformamide aqueous solution at 60° C. Further, the solidified thread was washed with clean water to remove the solvent, and then drawn to 1.4 times in hot water at 95° C. Next, an aqueous oil solution containing amino-modified silicone as a main component was added to the process fiber bundle after drawing so as to be 1.1% by mass, and the fibers were dry-densified.

The blend of the aqueous oil solution was 85% by mass of amino-modified silicone (manufactured by Shin-Etsu Chemical Co., Ltd., KF-865, primary side chain type, viscosity: 110 cSt (25° C.), amino equivalent: 5,000 g/mol) and 15% by mass of emulsifier (NIKKOL BL-9EX, POE (9) lauryl ether manufactured by Nikko Chemicals Co., Ltd.).

The dry-densified fiber bundle was drawn to 2.6 times between the heating rolls to further improve the orientation and densification and then wound to obtain an acrylic precursor fiber bundle. The single fiber fineness of the acrylic precursor fiber bundle was 1.0 dtex. In addition, 6 acrylic precursor fiber bundles were combined to obtain an acrylic precursor fiber bundle formed of 12,000 filaments.

Next, a plurality of acrylic precursor fiber bundles were introduced into a stabilization oven while being transported in parallel, and air heated to 220 to 280° C. was blown onto the acrylic precursor fiber bundles to impart stabilization thereto and obtain a stabilized fiber bundle with a density of 1.345 g/cm$^3$. The temperature gradient was set to be linear. The elongation ratio in the flame resistance treatment was 6% and the stabilization treatment time was 70 minutes.

Next, a stabilized fiber bundle was introduced into a first carbonization furnace having a temperature gradient of 300 to 700° C. in a nitrogen atmosphere and passed therethrough while applying elongation of 4.5% thereto. The temperature gradient was set to be linear. The treatment time was 2.0 minutes. Further, the fiber bundle was introduced into a second carbonization furnace having a linear temperature gradient of 1000 to 1350° C. in a nitrogen atmosphere to obtain a carbon fiber bundle. The elongation ratio in the second carbonization furnace was −4.0% and the treatment time was 1.5 minutes.

Next, the carbon fiber bundle was moved through a 10% by mass aqueous solution of ammonium bicarbonate and an electrical conduction treatment was performed between the carbon fiber bundle as an anode and a counter electrode such that the amount of electricity was 100 coulombs per 1 g of the carbon fiber bundle, which was then washed with warm water at 90° C. and dried. Next, an aqueous dispersion including a sizing agent was attached thereto so as to be 0.2% by mass and a carbon fiber bundle a-1 was wound around a bobbin.

The aqueous dispersion including the sizing agent was prepared by mixing 80 parts by mass of "Epikote 828" manufactured by Japan Epoxy Resin Co., Ltd., as the main agent and 20 parts by mass of "Pluronic F88" manufactured by Asahi Denka Co., Ltd., as the emulsifier, and carrying out phase inversion emulsification.

Table 1 shows various properties of the obtained carbon fiber a-1 and various properties of the carbon fiber bundle A-1 formed of the carbon fiber a-1 according to the measurement methods described below. The average roughness Ra was 1.9 nm, the height difference (Rp-v) was 13 nm and the fiber surface was smooth, and the ipa value exhibited a value as high as 0.18 µA/cm$^2$. The quantity of oxygen-containing functional groups ($O_{1S}/C_{1S}$) and the quantity of nitrogen-containing functional groups ($N_{1S}/C_{1S}$) also exhibited values as high as 0.09 and 0.08, respectively. The major axis/minor axis ratio of carbon fiber a-1 was 1.005, the density was 1.81 g/cm$^3$, and the single fiber fineness was 0.048 mg/m. The carbon fiber bundle A-1 had a strand strength of 5800 MPa, a strand elastic modulus of 285 GPa, a knot strength of 800 N/mm$^2$, a content of a metal component of 40 ppm, and a Si amount of 200 ppm.

Manufacturing Example 2

A spinning dope was prepared by dissolving an acrylonitrile-based polymer, which was obtained by polymerizing a monomer mixture obtained by mixing acrylonitrile and methacrylic acid at a mass ratio of 98:2, in dimethylformamide so as to have a concentration of 23.5% by mass.

The spinning dope was briefly spun in the air from a spinning ejection holes, in which 2000 discharge holes with a diameter of 0.15 mm were formed, and passed through a space of approximately 5 mm, and then solidified by immersion in a 79.5% by mass dimethylformamide aqueous solution (solidifying solution) temperature-controlled to 8° C., and 2000 filaments were brought together and taken as a coagulated fiber.

Next, the coagulated fiber was drawn to 1.1 times in air and then drawn to 2.9 times in a 55% by mass dimethylformamide aqueous solution at 80° C. Further, the coagulated fiber was washed with clean water to remove the solvent, and then drawn to 0.98 times in hot water at 95° C. Next, an aqueous oil solution containing amino-modified silicone as a main component was added to the process fiber bundle after drawing so as to be 1.1% by mass, and the fibers were dried and densified. Here, the same aqueous oil solution as in Manufacturing Example 1 was used.

The dry-densified fiber bundle was drawn to 4.0 times in a drawing facility heated by steam to further improve the orientation and perform densification and then wound to obtain an acrylic precursor fiber bundle. The single fiber fineness of the acrylic precursor fiber bundle was 0.84 dtex. In addition, 9 acrylic precursor fiber bundles were combined to obtain an acrylic precursor fiber bundle formed of 18,000 filaments.

A plurality of acrylic precursor fiber bundles were introduced into a stabilization oven while being transported in parallel, and air heated to 220 to 280° C. was blown onto the acrylic precursor fiber bundles to impart stabilization thereto and obtain a stabilized fiber bundle with a density of 1.345 g/cm$^3$. The temperature gradient was set to be linear. The elongation ratio in the flame resistance treatment was 6% and the stabilization treatment time was 70 minutes.

Next, a stabilized fiber bundle was introduced into a first carbonization furnace having a temperature gradient of 300 to 700° C. in a nitrogen atmosphere and passed therethrough while applying elongation of 4.0% thereto. The temperature gradient was set to be linear. The treatment time was 2.0 minutes. Further, the fiber bundle was introduced into a second carbonization furnace having a linear temperature gradient of 1000 to 1400° C. in a nitrogen atmosphere to obtain a carbon fiber bundle. The elongation ratio in the second carbonization furnace was −4.0% and the treatment time was 1.5 minutes.

Next, the carbon fiber bundle was moved through an 8% by mass aqueous solution of ammonium bicarbonate and an electrical conduction treatment was performed between the carbon fiber bundle as an anode and a counter electrode such that the amount of electricity was 40 coulombs per 1 g of the carbon fiber bundle, which was then washed with warm water at 90° C. and dried. Next, an aqueous dispersion including a sizing agent was attached thereto so as to be 0.2% by mass and the carbon fiber bundle a-2 was wound around a bobbin.

Here, the same aqueous dispersion including a sizing agent as in Manufacturing Example 1 was used.

Table 1 shows various properties of an obtained carbon fiber a-2 and various properties of a carbon fiber bundle A-2 formed of the carbon fiber a-2.

The average roughness Ra was 2.2 nm and the fiber surface was smooth, while the ipa value exhibited a value as high as 0.14 μA/cm². The quantity of oxygen-containing functional groups ($O_{1s}/C_{1s}$) and the quantity of nitrogen-containing functional groups ($N_{1s}/C_{1s}$) also exhibited values as high as 0.08 and 0.10, respectively. The major axis/minor axis ratio of the carbon fiber a-2 was 1.005, the density was 1.82 g/cm³, the single fiber fineness was 0.044 mg/m, the strand strength of the carbon fiber bundle A-2 was 6100 MPa, and the strand elastic modulus was 285 GPa.

Manufacturing Example 3

A spinning dope was prepared by dissolving an acrylonitrile-based polymer, which was obtained by polymerizing a monomer mixture obtained by mixing acrylonitrile, methacrylic acid, and acrylamide in a mass ratio of 97:1:2, in dimethylformamide such that the concentration was 21% by mass. The spinning dope was discharged from a spinning ejection holes, in which 24,000 discharge holes having a diameter of 60 μm were formed, into a congealed liquid filled with a 66% by mass dimethylacetamide aqueous solution temperature-controlled to 38° C. and solidified, and 24,000 filaments were brought together and taken as a coagulated fibers.

Next, the coagulated fibers was drawn to 1.1 times in air and then drawn to 4.6 times at the same time as washing with hot water. Next, drawing of 0.98 times was performed in hot water at 95° C.

An aqueous oil solution containing amino-modified silicone as a main component was added to the process fiber bundle after drawing so as to be 1.1% by mass, and the fiber bundle was dry-densified. Here, the same aqueous oil solution as in Manufacturing Example 1 was used. The fiber bundle after dry-densification was drawn to 3.0 times in a drawing facility heated by steam to further improve the orientation and densification and then wound to obtain an acrylic precursor fiber bundle. The single fiber fineness of the acrylic precursor fiber bundle was 0.77 dtex.

A plurality of acrylic precursor fiber bundles were introduced into a stabilization oven while being transported in parallel, and air heated to 220 to 280° C. was blown onto the acrylic precursor fiber bundles to impart stabilization thereto and obtain a stabilized fiber bundle with a density of 1.345 g/cm³. The temperature gradient was set to be linear. The elongation ratio in the stabilization treatment was −4.0% and the stabilization treatment time was 70 minutes.

Next, a stabilized fiber bundle was introduced into a first carbonization furnace having a temperature gradient of 300 to 700° C. in a nitrogen atmosphere and passed therethrough while applying elongation of 4.5% thereto. The temperature gradient was set to be linear. The treatment time was 1.5 minutes. Further, the fiber bundle was introduced into a second carbonization furnace having a linear temperature gradient of 1000 to 1450° C. in a nitrogen atmosphere to obtain a carbon fiber bundle. The elongation ratio in the second carbonization furnace was −4.5% and the treatment time was 1.5 minutes.

Next, the carbon fiber bundle was moved through an 8% by mass aqueous solution of ammonium bicarbonate and an electrical conduction treatment was performed between the carbon fiber bundle as an anode and a counter electrode such that the amount of electricity was 30 coulombs per 1 g of the carbon fiber bundle, which was then washed with warm water at 90° C. and dried. Next, an aqueous dispersion including a sizing agent was attached thereto so as to be 0.4% by mass and the carbon fiber bundle a-2 was wound around a bobbin.

The same aqueous dispersion including a sizing agent as in Manufacturing Example 1 was used.

Table 1 shows various properties of the obtained carbon fiber a-3 and various properties of the carbon fiber bundle A-3 formed of the carbon fiber a-3. The average roughness Ra was 6.0 nm, the height difference (Rp-v) was 44 nm and the roughness of the fiber surface was large, and the ipa value exhibited a value as low as 0.12 μA/cm². The quantity of oxygen-containing functional groups ($O_{1s}/C_{1s}$) and the quantity of nitrogen-containing functional groups ($N_{1s}/C_{1s}$) also exhibited low values of 0.07 and 0.06, respectively. The density of carbon fiber a-3 was 1.81 g/cm³, and the single fiber fineness was 0.040 mg/m. The strand strength of the carbon fiber bundle A-3 was 5300 MPa, and the elastic modulus was 285 GPa.

TABLE 1

| | Carbon fiber a-1 | Carbon fiber a-2 | Carbon fiber a-3 |
|---|---|---|---|
| Ra [nm] | 1.9 | 2.2 | 6.0 |
| Rp-v [nm] | 13 | 18 | 44 |
| ipa value [μA/cm²] | 0.18 | 0.14 | 0.12 |
| $O_{1s}/C_{1s}$ [—] | 0.09 | 0.08 | 0.07 |
| $N_{1s}/C_{1s}$ [—] | 0.08 | 0.10 | 0.06 |
| Major axis/minor axis | 1.005 | 1.005 | 1.07 |
| Density [g/cm³] | 1.81 | 1.82 | 1.81 |
| Mass per unit length of single fiber [mg/m] | 0.048 | 0.044 | 0.040 |
| Strand strength [MPa] | 5,800 | 6,100 | 5,300 |
| Strand elastic modulus [GPa] | 285 | 285 | 285 |
| Knot tenacity [N/mm²] | 800 | 900 | 740 |
| Metal content [ppm] | 40 | 40 | 40 |
| Si amount | 200 | 120 | 300 |

(Method for Measuring Matrix Resin Composition B)
[Impact Strength of Film F]

The thermoplastic resin was kneaded at 380° C. with a single-screw extruder with a diameter of 40 mm and then extruded into a film shape using a T-die, uniaxially drawn in the MD direction such that the draw ratio was 1.1 times, and cooled with a cast roll temperature-controlled to approximately 210° C. to manufacture a film having a thickness of approximately 50p m. A test piece having a length of 100 mm and a width of 100 mm was cut out from the film. The test piece was fixed with a clamp using a hydro-shot high-speed impact tester "HTM-1 model" (manufactured by Shimadzu Corporation). A striking core with a ½ inch diameter was dropped at a falling speed of 3 in/sec on a center of the test piece under conditions of a temperature of 23° C. to apply an impact thereto and the impact absorption energy when the test piece was fractured was measured and divided by the film thickness to obtain the impact strength of the film.

[Tear Strength of Film F]

The thermoplastic resin was kneaded at 380° C. with a single-screw extruder with a diameter of 40 mm and then extruded into a film shape using a T-die uniaxially drawn in the MD direction such that the draw ratio was 1.1 times, and cooled with a cast roll at approximately 210° C. to manufacture a film having a thickness of approximately 50 μm. The tear strength of the obtained film was measured in the MD direction and the TD direction by the method specified in JIS K7128 (C method).

[Melting Point of Film F]

The melting point was measured using a DSC device (Pyris 1 manufactured by PerkinElmer Co., Ltd.) under the condition of a scanning speed of 10° C./min.

[Matrix Resin Composition B]

Films F were obtained using the following resins B-1 to B-5. Various properties were measured by the measurement method described above. The impact strengths of the films are shown in Table 2. The melting point of each resin was 335° C.

Resin B-1: PEEK resin (manufactured by Daicel Evonik Ltd., trade name "Vestakeep 3300G", tear strength in MD direction: 2420 N/mm, tear strength in TD direction: 2600 N/mm, MVR (melt volume rate): 17 cm$^3$/10 min (set temperature 380° C., load 5 kg)), crystal melting enthalpy: 41 J/g.

Resin B-2: Resin B-1/PEI resin (manufactured by Sabic, trade name "UItem CRS5011"=90/10 (% by mass), tear strength in MD direction: 2330 N/mm, tear strength in TD direction: 2720 N/mm), crystal melting enthalpy: 39 J/g.

Resin B-3: PEEK resin (manufactured by Solvay, trade name "KetaSpire KT-880NT"), tear strength in MD direction: 2410 N/mm, tear strength in TD direction: 2600 N/mm, MVR: 66 cm$^3$/10 min (set temperature 380° C., load 5 kg)), crystal melting enthalpy: 42 J/g.

Resin B-4: PEEK resin (manufactured by Victrex PLC, trade name "381G"), tear strength in MD direction: 2550 N/mm, tear strength in TD direction: 2560 N/mm, MVR: 12 cm$^3$/10 min (set temperature 380° C., load 5 kg)), crystal melting enthalpy: 45 J/g.

Resin B-5: PEEK resin (manufactured by Daicel Evonik Ltd., trade name "Vestakeep J ZV7402", tear strength in MD direction: 2700 N/mm, tear strength in TD direction: 2800 N/mm, MVR: 55 cm$^3$/10 min (set temperature 380° C., load 5 kg)), crystal melting enthalpy: 35 J/g.

(Method for Measuring Fiber-Reinforced Resin Prepreg Molded Plate)

[Void Content]

The molded plate was cut in the thickness direction such that the cut surface was perpendicular to the fiber axis direction of the carbon fiber bundle and the cut surface was observed with a digital microscope (VHX series manufactured by KEYENCE Corporation) at a magnification of 200 times. A range of approximately 2 mm×3 mm was analyzed using image analysis software (Image J, manufactured by US National Institutes of Health) and the void content of the molded plate was calculated from the area ratio.

When the void content is less than 1%, there is no problem with the mechanical characteristics of the molded plate.

[90° Flexural Strength]

A three-point bending test was performed on the molded plate by a measuring method in accordance with ASTM D790 and the 90° flexural strength $F_{90}$ in the direction perpendicular to the fiber axis direction of the carbon fiber bundle was measured at room temperature (23° C.). A universal testing machine (manufactured by Instron, 4465 model) was used as the testing machine.

[Mode I Interlayer Fracture Toughness Value]

A mode I interlayer fracture toughness test was performed on the molded plate by a measuring method in accordance with ASTM D5528 and a fracture toughness value G1c at room temperature (23° C.) was measured. A universal testing machine (manufactured by Instron, 4465 model) was used as the testing machine.

[Mode II Interlaminar Fracture Toughness Value]

A mode II interlaminar fracture toughness test was performed on the molded plate by a measurement method based on BMS8-276 and a fracture toughness value G2c at room temperature (23° C.) was measured. A universal testing machine (manufactured by Instron, 4465 model) was used as the testing machine.

Example 1

The resin B-1 was kneaded at 350° C. with a single-screw extruder with a diameter of 40 mm, then extruded into a film using a T-die, and cooled with a cast roll at approximately 160° C. to obtain the film f with a thickness of 15 μm.

A 15 μm film f was superposed on both surfaces of a sheet-shaped carbon fiber base material having a carbon fiber areal weight of 75 g/m$^2$ in which the carbon fiber a-1 obtained in Manufacturing Example 1 was oriented unidirectionally, and the film was heated and melted to impregnate the carbon fiber base material to produce a fiber-reinforced resin prepreg. The thickness of the obtained prepreg was 0.07 to 0.08 mm and the fiber volume fraction was 58% by volume.

The obtained carbon fiber resin prepreg was cut to a predetermined size and then laminated in a steel mold such that the fiber axis directions of each of the prepregs were aligned unidirectionally. The mold on which the laminate was arranged was compressed with a heating and cooling two-stage press (manufactured by Shinto Metal Industries, Ltd., 50-ton press) at 380° C. and 5 MPa for 30 minutes, and the temperature was lowered to 200° C. in a few minutes to obtain molded plates with a thickness of approximately 2 mm and approximately 3 mm.

The void content of the obtained molded plate was 0.2% with very few residual defects, and, for the mechanical properties thereof, sufficiently high values were exhibited for $F_{90}$, G1c, and G2c.

Example 2

The film f having a thickness of approximately 25 m was obtained using the resin B-2 by the same method as in Example 1. A 25 μm film was superposed on the inner surface of a sheet-shaped carbon fiber base material having a carbon fiber areal weight of 190 g/m$^2$ in which the carbon fiber a-1 obtained in Manufacturing Example 1 was oriented unidirectionally, and the film was heated and melted to impregnate the carbon fiber base material to produce a fiber-reinforced resin prepreg. The thickness of the obtained prepreg was 0.18 to 0.19 mm. For the mechanical properties of the molded plate produced under the same conditions as in Example 1, sufficiently high values were exhibited for all of $F_{90}$, G1c, and G2c.

Examples 3 and 4

For the mechanical properties of the molded plate using carbon fiber a-1 and the resin B-3 or the resin B-4 by the same method as in Example 2, sufficiently high values were exhibited for all of $F_{90}$, G1c, and G2c.

Example 5

For the mechanical properties of the molded plate using carbon fiber a-2 and resin B-1 by the same method as in Example 2, sufficiently high values were exhibited for $F_{90}$, and general values were exhibited for G1c and G2c.

Example 6

For the mechanical properties of the molded plate using carbon fiber a-2 and resin B-2 by the same method as in Example 2, general values were exhibited for $F_{90}$, G1c, and G2c, but DMA-Tg, which is able to be measured by DMA (dynamic viscoelasticity measurement) in accordance with ASTM D7028 exhibited a heat resistance as high as 165° C.

Comparative Example 1

A prepreg was produced with the same method as in Example 1 except that the PEEK resin B-5 was used and a molded plate was obtained. The void content of the molded plate was 0.12% with very few residual defects; however, for the mechanical properties thereof, general values were exhibited for G1c and G2c, but $F_{90}$ exhibited a low value.

Comparative Examples 2 and 3

A molded plate using carbon fiber a-3 and resin B-1 or B-2 was obtained by the same method as in Example 2. As for the mechanical properties, $F_{90}$ exhibited a low value.

Comparative Example 4

As the prepreg, a PEEK prepreg (trade name, Cetex1200, carbon fiber IM7, carbon fiber areal weight 145 g/m²) manufactured by TenCate Advanced Composite Co., Ltd., was used and a molded plate was obtained by the same method as in Example 1 except that the compression time of the laminate was changed to 10 minutes. The void content of the molded plate was 0.1% or less with very few residual defects, and the mechanical property $F_{90}$ was 122 MPa. In addition, DMA-Tg which is able to be measured by DMA (dynamic viscoelasticity measurement) in accordance with ASTM D7028 exhibited 145° C.

The conditions and evaluation results of each Example are shown in Table 2, Table 3, and Table 4.

TABLE 2

| Carbon fiber | Type | Example 1 | Example 2 | Example 3 |
|---|---|---|---|---|
| Carbon fiber | Type | Carbon fiber a-1 | Carbon fiber a-1 | Carbon fiber a-1 |
| | ipa value [μA/cm²] | 0.18 | 0.18 | 0.18 |
| | Ra[nm] | 1.9 | 1.9 | 1.9 |
| Resin | Type | B-1 | B-2 | B-3 |
| | Film impact strength [kJ/m] | 15.1 | 19.2 | 15.5 |
| Composite material | Flexural strength $F_{90}$ [MPa] | 146 | 138 | 167 |
| | Interlaminar fracture toughness value G1c [kJ/m²] | 1.7 | 1.6 | 1.7 |
| | Interlaminar fracture toughness value G2c [kJ/m²] | 1.5 | 1.7 | 1.7 |

TABLE 3

| | | Example 4 | Example 5 | Example 6 |
|---|---|---|---|---|
| Carbon fiber | Type | Carbon fiber a-1 | Carbon fiber a-2 | Carbon fiber a-2 |
| | ipa value [μA/cm²] | 0.18 | 0.14 | 0.14 |
| | Ra[nm] | 1.9 | 2.2 | 2.2 |
| Resin | Type | B-4 | B-1 | B-2 |
| | Film impact strength [kJ/m] | 15.8 | 15.1 | 19.2 |
| Composite material | Flexural strength $F_{90}$ [MPa] | 121 | 125 | 116 |
| | Interlaminar fracture toughness value G1c [kJ/m²] | 1.8 | 1.0 | 1.2 |
| | Interlaminar fracture toughness value G2c [kJ/m²] | 1.4 | 0.9 | 1.0 |

TABLE 4

| | | Comparative Example 1 | Comparative Example 2 | Comparative Example 3 |
|---|---|---|---|---|
| Carbon fiber | Type | Carbon fiber a-1 | Carbon fiber a-3 | Carbon fiber a-3 |
| | ipa value [μA/cm²] | 0.18 | 0.12 | 0.12 |
| | Ra[nm] | 1.9 | 6.0 | 6.0 |
| Resin | Type | B-5 | B-1 | B-2 |
| | Film impact strength [kJ/m] | 10.3 | 15.1 | 19.0 |
| Composite material | Flexural strength $F_{90}$ [MPa] | 87 | 109 | 104 |
| | Interlaminar fracture toughness value G1c [kJ/m²] | 1.3 | 1.9 | 1.0 |
| | Interlaminar fracture toughness value G2c [kJ/m²] | 1.1 | 1.4 | 1.4 |

As shown in Table 2, in Examples 1 to 6 using prepregs satisfying the conditions of the present invention, the 90° flexural strength $F_{90}$ was higher than in Comparative Examples 1 to 5 using prepregs not satisfying the conditions, and the mechanical characteristics of G1c and G2c, which are interlaminar fracture toughness values, were excellent.

The invention claimed is:
1. A fiber-reinforced resin prepreg, comprising:
a carbon fiber bundle; and
a matrix resin composition,
wherein
mass per unit length of single fibers constituting the carbon fiber bundle is 0.030 to 0.055 mg/m,
an ipa value of the carbon fiber bundle measured by cyclic voltammetry is 0.14 μA/cm² or more, and
the matrix resin composition satisfies Condition 1 specified below:
Condition 1: an impact strength of a film obtained by solidifying the matrix resin composition under Molding Conditions specified below is 12.0 KJ/m or more, and the impact strength is measured using Impact Test specified below:
Molding Conditions: the matrix resin composition is extruded and drawn at a draw ratio of 1.1 times, and brought into contact for three seconds with a roll temperature-controlled to a temperature of (Tm −125° C.) in a case where a crystal melting enthalpy ΔHm of the matrix resin composition is 10 J/g or more, or to a temperature of (Tg −30° C.) in a case where the crystal melting enthalpy ΔHm of the matrix resin composition is less than 10 J/g, thereby obtaining a film having a thickness of 40 to 60 μm, where Tg and Tm are respectively a glass transition temperature and a melting point measured using differential scanning calorimetry in accordance with ISO11357, Impact Test: a test piece of 100 mm in length and 100 mm in width is cut out of the film, the test piece is fixed with a clamp, a striking core with a ½ inch diameter is dropped at a falling speed of 3 m/sec on a center of the test piece at a temperature of 23° C. to apply an impact thereto, and impact absorption energy when the test piece is fractured is measured and divided by the film thickness to obtain the impact strength of the film.

2. The fiber-reinforced resin prepreg according to claim 1, wherein the matrix resin composition is a thermoplastic resin composition.

3. The fiber-reinforced resin prepreg according to claim 1, wherein an average roughness Ra of a surface of single fibers constituting the carbon fiber bundle is 1.0 nm or more and 4.0 nm or less.

4. The fiber-reinforced resin prepreg according to claim 3, wherein
   $O_{1S}/C_{1S}$, which is a quantity of oxygen-containing functional groups on a surface of the carbon fiber bundle measured by X-ray photoelectron spectroscopy, is 0.070 or more and 0.130 or less; and
   $N_{1S}/C_{1S}$, which is a quantity of nitrogen-containing functional groups on the surface of the carbon fiber bundle measured by X-ray photoelectron spectroscopy, is 0.065 or more and 0.100 or less.

5. The fiber-reinforced resin prepreg according to claim 1, wherein the ipa value of the carbon fiber bundle is 0.14 μA/cm² or more and 0.20 μA/cm² or less.

6. The fiber-reinforced resin prepreg according to claim 1, wherein
   $O_{1S}/C_{1S}$, which is a quantity of oxygen-containing functional groups on a surface of the carbon fiber bundle measured by X-ray photoelectron spectroscopy, is 0.070 or more and 0.130 or less; and
   $N_{1S}/C_{1S}$, which is a quantity of nitrogen-containing functional groups on the surface of the carbon fiber bundle measured by X-ray photoelectron spectroscopy, is 0.065 or more and 0.100 or less.

7. The fiber-reinforced resin prepreg according to claim 1, wherein
   a strand strength of the carbon fiber bundle is 5600 MPa or more and
   a strand elastic modulus of the carbon fiber bundle is 250 GPa or more and 380 GPa or less.

8. The fiber-reinforced resin prepreg according to claim 1, wherein the matrix resin composition satisfies Condition 2 specified below:
   Condition 2: the impact strength of the film is 12.0 KJ/m or more and 20.0 KJ/m or less.

9. The fiber-reinforced resin prepreg according to claim 1, wherein the carbon fiber bundle is included in a carbon fiber base material and is oriented unidirectionally.

10. The fiber-reinforced resin prepreg according to claim 1, wherein the matrix resin composition satisfies Condition 3 specified below:
    Condition 3: when the matrix resin composition is drawn at the draw ratio of 1.1 times and is made into the film having a thickness of 40 to 60 μm, a tear strength of the film measured by a method specified in JIS K7128 (C method) in both a MD direction and a TD direction is 1200 N/mm or more.

11. The fiber-reinforced resin prepreg according to claim 1, wherein the matrix resin composition contains a polyarylketone resin having a branched structure.

12. The fiber-reinforced resin prepreg according to claim 1, wherein the matrix resin composition contains a polyarylketone resin having a melt volume rate of 1 to 80 cm³/10 min, the melt volume rate being measured according to ISO1133 at a set temperature of 380° C. and a load of 5 kg.

13. The fiber-reinforced resin prepreg according to claim 12, wherein the matrix resin composition contains the polyarylketone resin and a polyetheretherketone resin having a structural unit represented by Formula (4):

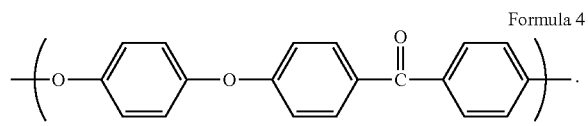

Formula 4

14. The fiber-reinforced resin prepreg according to claim 1, wherein the matrix resin composition contains a polyetheretherketone resin having a structural unit represented by Formula (4) and a polyarylketone resin other than the polyetheretherketone resin:

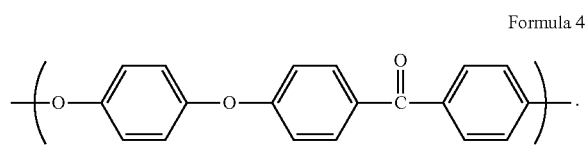

Formula 4

15. A molded article obtained by a process comprising: molding a molding material including the fiber-reinforced resin prepreg according to claim 1.

16. A fiber-reinforced thermoplastic resin prepreg, comprising:
    a matrix resin composition, and
    a carbon fiber base material including a carbon fiber bundle,
    wherein
    the matrix resin composition is impregnated in the carbon fiber base material,
    an average roughness Ra of a surface of single fibers constituting the carbon fiber bundle included in the carbon fiber base material is 1.0 to 4.0 nm,
    mass per unit length of the single fibers constituting the carbon fiber bundle included in the carbon fiber base material is 0.030 to 0.055 mg/m,
    an ipa value of the carbon fiber bundle measured by cyclic voltammetry is 0.14 to 0.20 μA/cm², and
    the matrix resin composition is a thermoplastic resin composition having an impact absorption energy of 0.7 J or more measured using Impact Test specified below:
    Impact Test: a test piece of 100 mm in length and 100 mm in width is cut out of a film having a thickness of 100 μm formed using the matrix resin composition, the test piece is fixed with a clamp, a striking core with a ½ inch diameter is dropped at a falling speed of 3 m/sec on a center of the test piece at a temperature of 23° C. to apply an impact thereto, and impact absorption energy when the test piece is fractured is measured.

17. A method for producing a fiber-reinforced resin prepreg, the method comprising:

impregnating a carbon fiber bundle with a matrix resin composition, wherein
mass per unit length of single fibers constituting the carbon fiber bundle is 0.030 to 0.055 mg/m,
an ipa value of the carbon fiber bundle measured by cyclic voltammetry is 0.14 µA/cm² or more, and
the matrix resin composition satisfies Condition 1 specified below:
Condition 1: an impact strength of a film obtained by solidifying the matrix resin composition under Molding Conditions specified below is 12.0 KJ/m or more, and the impact strength is measured using Impact Test specified below:
Molding Conditions: the matrix resin composition is extruded and drawn at a draw ratio of 1.1 times, and brought into contact for three seconds with a roll temperature-controlled to a temperature of (Tm −125° C.) in a case where a crystal melting enthalpy ΔHm of the matrix resin composition is 10 J/g or more, or to a temperature of (Tg −30° C.) in a case where the crystal melting enthalpy ΔHm of the matrix resin composition is less than 10 J/g, thereby obtaining a film having a thickness of 40 to 60 µm, where Tg and Tm are respectively a glass transition temperature and a melting point measured using differential scanning calorimetry in accordance with ISO11357,
Impact Test: a test piece of 100 mm in length and 100 mm in width is cut out of the film, the test piece is fixed with a clamp, a striking core with a ½ inch diameter is dropped at a falling speed of 3 m/see on a center of the test piece at a temperature of 23° C. to apply an impact thereto, and impact absorption energy when the test piece is fractured is measured and divided by the film thickness to obtain the impact strength of the film.

18. The method according to claim 17, wherein the matrix resin composition contains a polyetheretherketone resin having a structural unit represented by Formula (4) and a polyarylketone resin other than the polyetheretherketone resin:

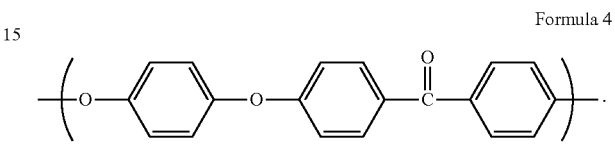

Formula 4

19. The method according to claim 17, wherein the carbon fiber bundle is included in a carbon fiber base material and is oriented unidirectionally.

20. The method according to claim 17, wherein an average unevenness Ra of a surface of single fibers constituting the carbon fiber bundle is 1.0 nm or more and 4.0 nm or less.

* * * * *